Nov. 26, 1929.  J. M. J. F. MEYNIER  1,736,932
PROGRESSIVE CLUTCH AND CHANGE SPEED GEAR
Filed Dec. 27, 1928  2 Sheets-Sheet 1

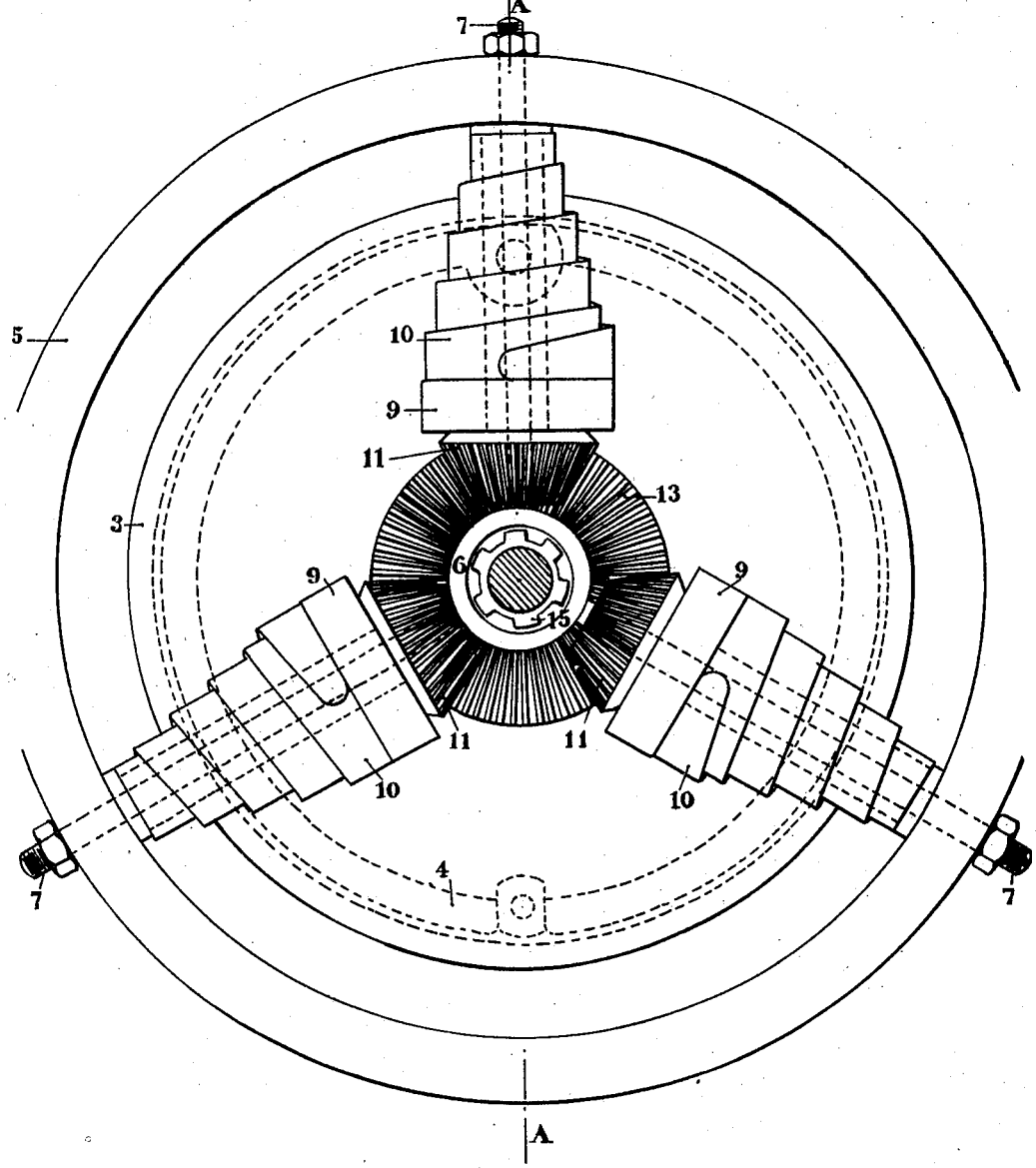

Patented Nov. 26, 1929

1,736,932

UNITED STATES PATENT OFFICE

JACQUES MARIE JEAN FRÉDÉRIC MEYNIER, OF TROYES, FRANCE

PROGRESSIVE CLUTCH AND CHANGE-SPEED GEAR

Application filed December 27, 1928, Serial No. 328,825, and in France January 9, 1928.

The present invention has for its object a device for the transmission of the movement of rotation from a driving shaft to a driven shaft, constituting both a progressive clutch and a progressive change speed gear, applicable to various engines and machines, and more particularly to motor vehicles.

The new device is substantially characterized by the combination of the following rotary elements loosely mounted on a shaft to be driven:

(a) A first friction plate, driven by the driving shaft;

(b) A second driving plate arranged opposite the first one and provided with means necessary to hold it stationary at will;

(c) Two bevel gears arranged between both plates and which may be rendered rigid with the shaft to be driven;

(d) A movable device comprising radial shafts each carrying a bevel pinion constantly in engagement with both gears above mentioned and a roller in contact with the two friction plates and movable along the shaft which carries it so as to move towards the center of the said plates under the action of a spring and to move away from this center under the action of centrifugal force.

In order that the invention may be clearly understood, an embodiment of the same will be described hereinafter, by way of example only, with reference to the accompanying drawing in which:

Fig. 2 is a front view, the driving plate and one of the gears loosely mounted on the shaft to be driven being removed.

Figure 1:
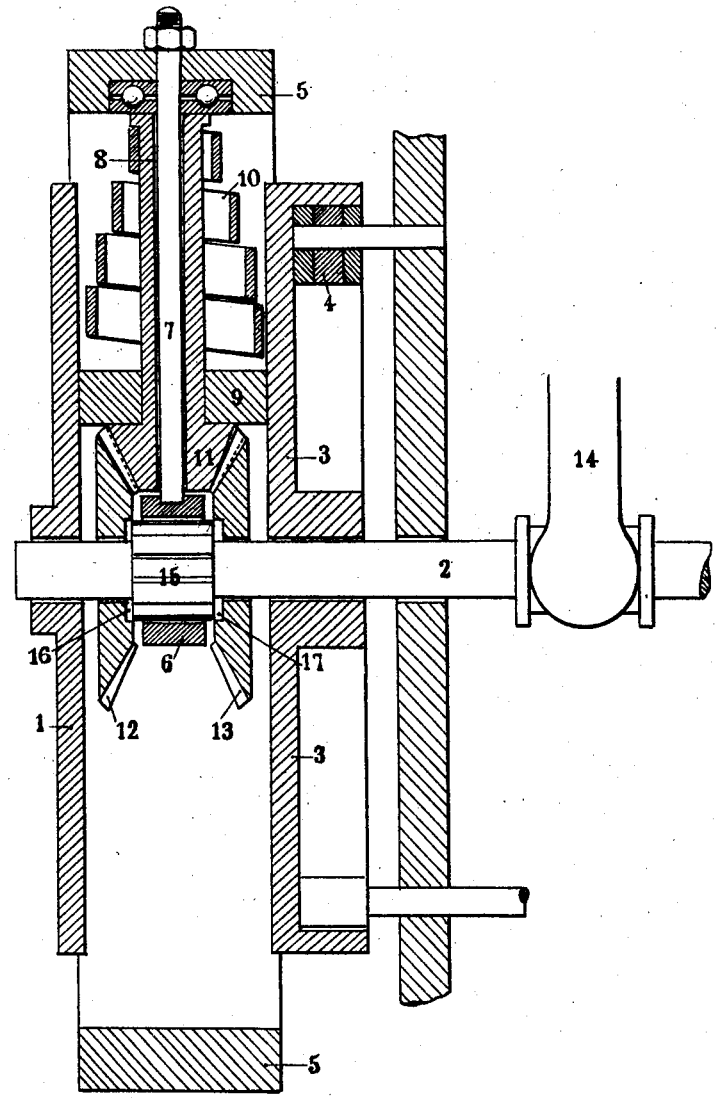
Fig. 1 is a longitudinal vertical section made according to line A—A of Fig. 2.

As illustrated in the drawing, the progressive clutch and change speed gear essentially comprise a friction plate 1 which receives its movement of rotation from the driving shaft through any suitable means and is, in the example shown, centered on the end of the shaft 2 to be driven.

On this shaft 2 is also loosely mounted a second plate 3 arranged parallel to the first one and capable or not of being held stationary by means of a brake of suitable type, such for instance as the band brake indicated at 4.

Between these two plates is mounted a movable device comprising two concentric rings 5 and 6 rigidly connected together by a number of radial arms 7 on which are loosely mounted shafts 8 each carrying a cylindrical roller 9.

These rollers are held firmly pressed against the plates 1 and 3 by means of a powerful spring (not shown) so arranged as to firmly push the plate 3 towards the driving plate 1.

The plates 1 and 3 as well as the friction rollers 9 constitute a planetary gear the planet members 9 of which are mounted on the tubular shafts 8 so as to drive these latter in their movement of rotation.

For that purpose, these tubular shafts 8 have externally a polygonal or fluted shape so as to be in engagement with the rollers 9 and to allow the latter to longitudinally move on the said shafts either under the action of springs 10; or under the action of centrifugal force and to thus move towards or away from the center of the plates.

The tubular shafts 8 carry, on the other hand, on the side of the center of the apparatus, bevel gears 11 which are constantly in engagement with two other bevel wheels 12 and 13 loosely mounted on the shaft 2 to be driven, but may be rendered separately rigid with the latter.

For that purpose, the shaft 2, which may be longitudinally moved by a fork 14 or a suitable lever, carries a clutch sleeve 15 the claws of which can, at will, be brought in engagement with corresponding claws 16 and 17 respectively provided on the pinions 12 and 13.

When the apparatus above described is in the position of rest, the friction rollers 9 are pushed back towards the center of the plates 1 and 3 by their respective springs 10, the bevel wheels 12 and 13 are loose on the shaft 2 and the plate 3 is not braked.

If the numbers of the teeth of the pinions and bevel wheels are in the ratio of 1 to 2, for instance, the operation of the apparatus is as follows:

The plate 1 rigid with the fly wheel of the driving shaft drives in its rotation the rollers 9, which are clamped between this plate 1 and the plate 3.

The latter not being braked, is urged by the rollers 9 and freely rotates about the shaft 2 as well as the gears 12 and 13 driven by the pinions 11 rotating with the rollers 9. The device is stationary and no actuation of the shaft 2 takes place; it is in neutral position.

If the gear 12 is thrown in engagement with the shaft 2, this gear is held stationary by the resistance of the shaft 2, while the gear 13, which is free, rotates in a direction reverse to that of the rollers 9.

The gear 12 being held stationary, causes the planetary gear to be driven in reverse direction to the rotation of the engine, through the medium of the pinions 11, shafts 8 and friction rollers 9. If, in these conditions, the plate 3 is braked, the planetary gear is driven in the same direction as the driving shaft, but at a speed which becomes progressively equal to one half of that of the said driving shaft. The gears are driven in this movement and the shaft 2 receives a rotary movement in the same direction as that of the driving shaft, but its speed, in the example illustrated, is only the quarter of that of the said driving shaft, as it is diminished by one half by planetary action, and of one half again owing to the ratio of the pinions, as previously explained.

The speed of rotation of the engine progressively increasing, the sliding movement and centrifugal force move the friction rollers outwardly, against the action of the springs 10. The speed of rotation of these rollers increases therefore and, consequently, that transmitted by the gears 11 and 12 to the shaft 2.

If the resistance increases, the speed of rotation diminishes and the rollers 9 are automatically brought back towards the center of the plates 1 and 3 by the action of the springs 10, so that the speed transmitted to the shaft 2 is diminished at the same time as the force increases.

The system of planetary gear provided with sliding friction rollers allows therefore to obtain in both cases a reversible effect and to ensure the automaticity of the variation of the speed.

For reversing the direction of rotation of the shaft 2 and obtaining backward running, the gear 12 is thrown out of engagement and the pinion 13 is thrown in gear with the shaft 2 by a suitable longitudinal displacement of the said shaft.

In this case, the planetary movement resulting from this throwing in gear is of the same direction as that of the engine and there is no reversal of direction when the engagement takes place with the plate 3.

It is to be noted that the above apparatus utilizes, for the regulation of the rotary movement transmitted and its automatic variation, a force spontaneously created owing to the construction of the said apparatus and due to the centrifugal force acting on the rollers owing to their very rotation and to a "sliding" force which is uniformly exerted on the rollers.

This force is due to the fact that the circumferences of the rollers and plates in frictional contact do not geometrically correspond, this resulting in a thrust of the rollers (which can move) on the side where the contact is the longer, that is to say, on the outer side, relatively to the centers of rotation of the rollers and plates.

This spontaneous force is proportional to the thickness of the rollers, to the pressure of adherence exerted and to the speed of rotation.

This regulating action therefore adds itself to that of centrifugal force, but it acts immediately upon starting, when centrifugal force is nearly inexisting, and it supplies it, from this moment, as accelerating and regulating force, precisely at the time it might fail or be insufficient.

The above arrangements are, of course, given by way of example only; the forms, materials and dimensions of the constituent parts as well as the details of construction may be varied without departing thereby from the scope of the invention.

Claims:—

1. Progressive clutch and change speed gear comprising: a shaft to be driven,—a first plate loosely rotating on the said shaft and adapted to be actuated by the engine,—a second plate parallel to the first one and also loosely mounted on the shaft to be driven,—means for holding the second plate stationary,—two bevel gears loosely mounted on the shaft to be driven and arranged between the two plates,—means for rendering one or the other of these gears rigid with the shaft to be driven,—two concentric rings,—radial arms connecting these rings,—tubular shafts having an external polygonal shape, loosely mounted on the radial arms,—a bevel pinion, rigid with each of these shafts and in engagement with the two bevel gears loosely mounted on the shaft to be driven,—cylindrical friction rollers mounted on the radial tubular shafts and resiliently clamped between the two plates loosely mounted on the shaft to be driven, these rollers being adapted to rotatively drive the shafts on which they are mounted and to move longitudinally on the latter and move towards or away from the center of the plates,—a spring interposed between each friction roller and the external ring and adapted to push back the said rollers towards the center of the plates.

2. Progressive clutch and change speed gear comprising: a shaft to be driven,—a first plate loosey rotating on the said shaft and adapted to be actuated by the engine,—a second plate parallel to the first one and also loosely mounted on the shaft to be driven,— a drum formed on the said plate and a brake arranged in this drum and adapted to hold the second plate stationary,—two bevel gears loosely mounted on the shaft to be driven and arranged between the two plates,—clutch claws formed on these gears,— a sleeve having double clutch claws, rigid with the shaft to be driven,—a fork adapted to longitudinally displace the said shaft to be driven and to bring one or the other of the series of clutch claws of the sleeves rigid with this shaft to be driven in engagement with the claws of one or the other of the bevel gears loosely mounted on the said shaft for rendering rigid with the latter one or the other of these bevel gears,—two concentric rings,—radial arms connecting these rings,— tubular shafts having an external polygonal shape, loosely mounted on the radial arms,— a bevel pinion, rigid with each of these shafts and in engagement with the two bevel gears loosely mounted on the shaft to be driven,— cylindrical friction rollers mounted on the radial tubular shafts and resiliently clamped between the two plates loosely mounted on the shaft to be driven, these rollers being adapted to rotatively drive the shafts on which they are mounted and to move longitudinally on the latter and move towards or away from the center of the plates,—a spring interposed between each friction roller and the external ring and adapted to push back the said rollers towards the center of the plates.

3. Progressive clutch and change speed gear comprising: a shaft to be driven,—a first plate loosely rotating on the said shaft and adapted to be actuated by the engine,— a second plate parallel to the first one and also loosely mounted on the shaft to be driven,—a drum formed on the said plate and a brake arranged in this drum and adapted to hold the second plate stationary,—two bevel gears loosely mounted on the shaft to be driven and arranged between the two plates,—clutch claws formed on these gears,— a sleeve having double clutch claws, rigid with the shaft to be driven,—a fork adapted to longitudinally displace the said shaft to be driven and to bring one or the other of the series of clutch claws of the sleeve rigid with this shaft to be driven in engagement with the claws of one or the other of the bevel gears loosely mounted on the said shaft for rendering rigid with the latter one or the other of these bevel gears,—two concentric rings,— radial arms connecting these rings,—tubular shafts having an external polygonal shape, loosely mounted on the radial arms,—a bevel pinion, rigid with each of these shafts and in engagement with the two bevel gears loosely mounted on the shaft to be driven,—cylindrical friction rollers carried by the radial tubular shafts and resiliently clamped between the two plates loosely mounted on the shaft to be driven by the spring pressing the second plate towards the first one, these rollers being adapted to rotative drive the radial tubular shafts on which they are mounted and to slide along these latter and to move towards or away from the center of the plates— a spring interposed between each friction roller and the external ring and adapted to push back the said rollers towards the center of the plates.

The foregoing specification of my "Progressive clutch and change speed gear"; signed by me this 13th day of December, 1928.

JACQUES MARIE JEAN FRÉDÉRIC MEYNIER.